(12) United States Patent (10) Patent No.: US 8,758,607 B2
Athanasiadis (45) Date of Patent: Jun. 24, 2014

(54) WATER TREATMENT

(75) Inventor: Konstantinos Athanasiadis, Everton Park (AU)

(73) Assignee: GHD Pty Ltd., Melbourne, Victoria (AU)

( * ) Notice: Subject to any disclaimer, the term of this patent is extended or adjusted under 35 U.S.C. 154(b) by 371 days.

(21) Appl. No.: 13/147,953

(22) PCT Filed: Feb. 2, 2010

(86) PCT No.: PCT/AU2010/000097
§ 371 (c)(1),
(2), (4) Date: Aug. 25, 2011

(87) PCT Pub. No.: WO2010/088718
PCT Pub. Date: Aug. 12, 2010

(65) Prior Publication Data
US 2011/0309024 A1 Dec. 22, 2011

Related U.S. Application Data

(60) Provisional application No. 61/207,013, filed on Feb. 5, 2009.

(51) Int. Cl.
*C02F 1/28* (2006.01)
*C02F 1/42* (2006.01)
*C02F 1/62* (2006.01)

(52) U.S. Cl.
USPC ...... 210/170.03; 210/254; 210/259; 210/282; 210/283; 210/289; 210/315; 210/316; 210/317; 210/502.1

(58) Field of Classification Search
USPC ......... 210/259–261, 282, 283, 289, 315, 317, 210/502.1, 170.03, 254, 316
See application file for complete search history.

(56) References Cited

U.S. PATENT DOCUMENTS

| 1,993,142 | A | * | 3/1935 | Johnson | 210/283 |
| 3,617,566 | A | * | 11/1971 | Oshima et al. | 210/693 |
| 4,184,947 | A | * | 1/1980 | Demisch | 210/617 |
| 4,454,044 | A |   | 6/1984 | Klein |   |
| 5,236,595 | A |   | 8/1993 | Wang et al. |   |
| 6,217,757 | B1 | * | 4/2001 | Fleischmann | 210/163 |
| 7,309,425 | B2 |   | 12/2007 | Bandyopadhya et al. |   |

(Continued)

FOREIGN PATENT DOCUMENTS

| CN | 101285314 A | 10/2008 |
| DE | 19750811 A1 | 5/1999 |
| WO | WO-96/20139 A1 | 7/1996 |
| WO | WO-2009/121093 A1 | 10/2009 |

OTHER PUBLICATIONS

Sprynskyy et al, Ammonium sorption from aqueous solutions by the natural zeolite Transcarpathian clinoptilolite studied under dynamic conditions, Dec. 2004, Journal of Colliid and Interface Science, vol. 284, pp. 408-415.*

(Continued)

*Primary Examiner* — Matthew O Savage
(74) *Attorney, Agent, or Firm* — Harness, Dickey & Pierce, P.L.C.

(57) ABSTRACT

Apparatus for treating run-off water, the apparatus including a mechanical-sorption filter for removing particulate and colloidal material; an ion exchange filter for removing positively charged ions; and, a sorption filter for removing at least other soluble contaminants.

22 Claims, 2 Drawing Sheets

(56) References Cited

U.S. PATENT DOCUMENTS

| | | |
|---|---|---|
| 7,488,418 B2 * | 2/2009 | Miller .................. 210/167.3 |
| 2003/0196960 A1 | 10/2003 | Hughes |
| 2006/0267336 A1 | 11/2006 | Peters et al. |
| 2008/0023383 A1 | 1/2008 | Sansalone |
| 2008/0083666 A1 * | 4/2008 | Brown et al. ............. 210/202 |

OTHER PUBLICATIONS

Maji et al, Arsenic removal from real-life groundwater by adsorption on laterite soil, Jun. 2007, Journal of Hazardous Materials, vol. 151, pp. 811-820.*

* cited by examiner

WATER TREATMENT

CROSS-REFERENCE TO RELATED APPLICATIONS

This application is a 371 U.S. National Stage of International Application No. PCT/AU2010/000097, filed Feb. 2, 2010. This application claims the benefit of U.S. Provisional Application No. 61/207,013, filed Feb. 5, 2009. The disclosures of the above applications are incorporated herein by reference.

BACKGROUND OF THE INVENTION

The present invention relates to a method and apparatus for treating water, and in particular to a method and apparatus for treating run-off water, such as storm water, to remove contaminants.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Surface run-off water is typically water, such as rain or storm water, which has flowed from a source, such as building roof, ground surface, or the like, for drainage. As the water flows over different surfaces it will typically pick-up contaminants, such as nutrients, heavy metals, particulate material and other debris, depending on the nature of the surface.

For example, metal roofing can lead to contamination with heavy metals both in dissolved, colloidal and particulate forms, whilst traffic surfaces, such as roads and car-parks, result in the presence of heavy metals, oils, hydrocarbons, nutrients, litter and other debris. Cultivated land can similarly lead to contamination with fertilisers and other materials, including phosphates and nitrates.

Surface run-off typically drains into streams and storm water drains, and consequently can lead to environmental damage, as well as contamination of drinking water sources. It is therefore desirable to be able to filter run-off water prior to the run-off being returned to the environment.

EP1522525 describes an assembly to treat rainwater from roofs and roads. The assembly includes a drain shaft with two spaced plates of a number of segments, mounted at intervals, forming a hollow zone with the plates held apart by a spacer. The zone accommodates an ion exchanger to reduce heavy metals in the water, as a unit which is sealed at one side and the ion exchanger is regenerated by a regenerating fluid passed through the unit. However, this provides only limited ability to remove certain contaminants, and is also difficult to maintain.

US-2008/0121579 describes a filtration system including a housing having a bottom portion, a middle portion coupled to the bottom portion and an upper portion, and a cap coupled to the upper portion; a sediment storage area within the bottom portion; a separator area within the middle portion; a porous filter within the upper portion; an access hatch within the cap; an inlet pipe for allowing storm water within a middle chamber; an outlet pipe for allowing filtered water to be discharged from the filtration system; and, a central pipe being a passageway through the porous filter.

The filter is a porous concrete filter acting as an absorption filter. The pores in the filter partly serve to physically separate contaminants from the water, with contaminants like hydrocarbons and dissolved heavy metals being adsorbed by the internal surfaces of the filter. Iron oxides and hydroxides can be included in the concrete filter to promote the chemical precipitation of heavy metals as insoluble metal hydroxides and phosphates as iron-phosphates.

However, this arrangement has a number of drawbacks. Firstly, the porous concrete filter acts via absorption and therefore has limited ability to remove certain contaminants such as nutrients. Secondly, the system uses a cyclonic separator to remove particulate material, with the resulting sediment requiring periodic extraction by an operator. Thirdly, during moderate and heavy rain events the contact time is limited resulting in poor performance. Finally, colloidal and particulate material would clog the filter resulting in higher maintenance costs.

U.S. Pat. No. 7,341,661A describes a sorptive-filtration system for removing at least one of negatively or positively charged ions, complexes or particulates from an aqueous stream. The system includes flow formed substantially from at least one of rainfall-runoff or snowmelt-runoff; a filter containment communicating with the runoff stream such that at least part of the stream passes through the filter containment; and a granular filter media disposed within the filter containment, the filter media having an amphoteric material applied thereto, wherein the amphoteric material comprises a metal selected from at least one of Fe, Al, Mn, or Si.

However, this system requires coating of the granular material, which results in the filter material being expensive, thereby significantly adding to the cost, and making it unsuitable for large scale processes.

US-2007/0163964 describes compositions for treating water including a filtration media having antimicrobial and biocidal properties for use in filtering particles and deactivating, removing and/or destroying microorganisms in a liquid. Suitable filter media includes perlite contacted by organosilane compositions. However, again this system requires processing of the filter material, resulting in the filter material being expensive.

US-2008/0023408 describes a catch basin that has a catch basin insert containing a water-soluble water treatment additive. The insert is made from a porous shell, which is segmented into individual pouches. Each pouch has an opening that can be opened and closed repeatedly to re-fill the water treatment additive. Adjacent pouches are separated by a strip of insert material to permit cutting the insert to a desired length. The water-soluble water treatment additive can be chitosan. Water treated with the additive is flocculated and removed in a filter. This has limited ability to deal with different contaminants and requires regular maintenance to ensure the treatment additive does not become exhausted.

Consequently, existing techniques for the removal of contaminants from run-off water are expensive and commercially unviable.

SUMMARY OF THE PRESENT INVENTION

The present invention seeks to substantially overcome, or at least ameliorate, one or more disadvantages of existing arrangements.

In a first broad form, the present invention seeks to provide apparatus for treating run-off water, the apparatus including:
  a) a mechanical-sorption filter for removing particulate and colloidal material;

b) an ion exchange filter for removing positively charged ions; and, c) a sorption filter for removing at least other soluble contaminants.

Typically the mechanical-sorption filter includes polypropylene flakes.

Typically the mechanical-sorption filter is for removing at least one of:
a) oil;
b) grease;
c) organic particulate material;
d) inorganic particulate material;
e) Organic colloidal material; and
f) Inorganic colloidal material.

Typically the ion exchange filter is for removing heavy metals.

Typically the ion exchange filter includes a zeolite filter material.

Typically the filter material is clinoptilolite.

Typically the filter material includes particles having a size of approximately 1 to 3 mm.

Typically the filter material is chemically conditioned before use.

Typically the chemical conditioning includes exposing the filter material to a salt solution.

Typically the salt solution is a sodium chloride solution.

Typically the ion exchange filter is for removing at least one of:
a) $NH_4^+$—N;
b) copper;
c) zinc;
d) lead;
e) Nickel;
f) Cadmium;
g) Mercury;
h) Vanadium;
i) Chromium;
j) Platinum;
k) Palladium;
l) Rhodium; and
m) Positive charged ions.

Typically the sorption filter includes a laterite filter material.

Typically the laterite filter material is treated to increase the filter material surface area, before use.

Typically the sorption filter is for removing at least one of:
a) arsenate;
b) arsenite;
c) heavy metals;
d) Nitrates;
e) Phosphates; and
f) Negatively charged ions.

Typically the apparatus includes a body containing the filters.

Typically the body includes a number of meshes defining filter regions, each filter region containing a respective filter material.

Typically the filter regions have a substantially annular shape.

Typically the filter regions are arranged concentrically, with the ion exchange filter and sorption filter being positioned radially inwardly of the mechanical-sorption filter.

Typically the sorption filter is positioned radially inwardly of the ion exchange filter.

Typically the apparatus includes a housing including an inlet for receiving water and an outlet for supplying filtered water, and wherein the body is coupled to at least one of the inlet and the outlet to thereby filter water flowing from between the inlet and outlet.

Typically the body includes a head coupled to the outlet, and wherein in use, water flows into the body, through the filter, and into the head, before draining from the housing via the outlet.

Typically the body is supported relative to the housing, thereby allowing the filters to drain when not in use.

Typically the housing includes an opening having a removable cover for providing access to the body.

Typically the body is a removable cartridge, allowing the body to be removed via the opening.

Typically the opening allows removal of filter material from the body, thereby allowing the filter material to be replenished.

In a second broad form, the present invention seeks to provide a method of treating run-off water, the method including:
a) using a mechanical-sorption filter to remove particulate and colloidal material;
b) using an ion exchange filter to remove positively charged ions; and,
c) using a sorption filter to remove at least other soluble contaminants.

The second broad form of the invention may be performed using apparatus according to the first broad form of the invention.

BRIEF DESCRIPTION OF THE DRAWINGS

An example of the present invention will now be described with reference to the accompanying drawings, in which:—

DETAILED DESCRIPTION OF THE PREFERRED EMBODIMENTS

Figure 1:
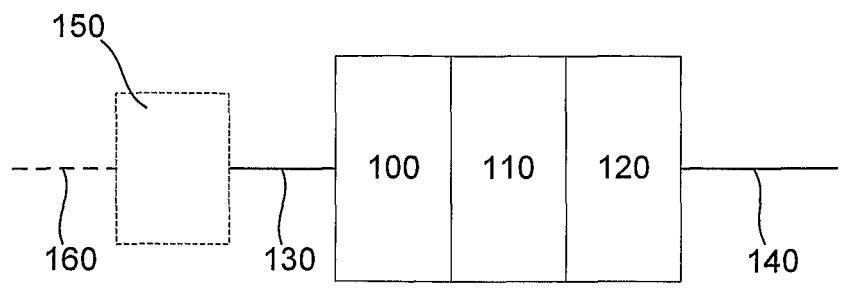
FIG. 1 shows a schematic diagram of an example of a system for treating run-off water.

An example of apparatus for treating surface run-off water will now be described with reference to FIG. 1.

In this example, the apparatus includes a mechanical-sorption filter 100, an ion exchange filter 110 and a sorption filter 120, coupled to an inlet pipe 130 and an outlet pipe 140. In use, run-off water received via the inlet pipe 130 passes through the mechanical-sorption, ion exchange and sorption filters 100, 110, 120 in turn, allowing filtered water to be supplied via the outlet pipe 140.

The apparatus may also include or be connected to an optional pre-filter 150 for pre-filtering the run-off water received via a pre-filter inlet pipe 160. However, this is not essential and any suitable configuration may be used. For example, the filtering apparatus, and in particular the mechanical-sorption, ion exchange and sorption filters 100, 110, 120 could be provided as part of an existing filtration system that has the capacity to filter total suspended solids (TSS). Accordingly, it will be appreciated that the design has the flexibility to be used both separate to and/or within filtration units targeting TSS.

When used within an existing filtration system, the filtering apparatus will typically be configured to fit the flow characteristics of the filtration system, thereby ensuring adequate filtering of the run-off water. Similarly, when used separate to a filtering system, the filtering apparatus will typically be configured to provide adequate filtering based on the characteristics of the region from which run-off water is received.

Figure 2:
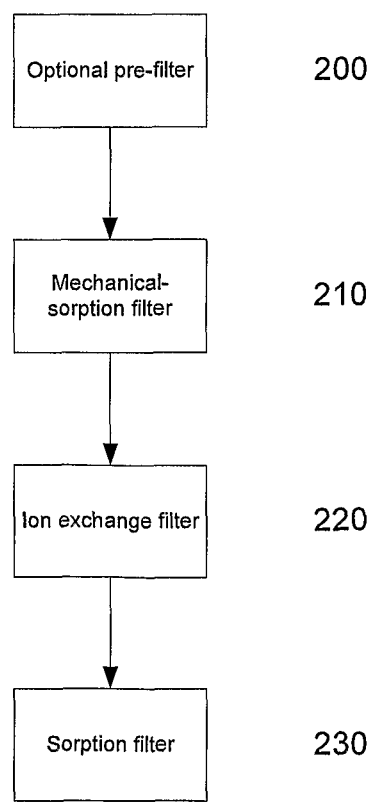
FIG. 2 shows a flow diagram of a process for treating run-off water.

An example process for treating run-off water using the above described apparatus will now be described with reference to FIG. 1 and FIG. 2.

At step 200, the run-off water is optionally pre-filtered, using the pre-filter 150, before being supplied to the mechanical-sorption filter 100. The pre-filter can be used for reducing turbidity and/or removing large scale contaminants, such as debris, leaves, litter, or other suspended solids (SS). Any suitable pre-filter may be used, and in one example this is in the form of a wire mesh filter. Alternatively, in one example, the pre-filter system may be required to remove SS by up to 70%, in which case a Gross Pollutant Trap or the like may be used.

At step 210, the run-off water is filtered through filter 100, using different mechanisms such as sieving, volume exclusion and sorption. This mechanical-sorption filter is typically used to filter particulate, colloidal contaminants and oil & grease, or the like, to avoid clogging of the subsequent downstream ion exchange and sorption filters 110, 120. In one example, the mechanical-sorption filter 100 includes polypropylene flakes, or the like, as will be described in more detail below.

At step 220, the ion exchange filter 110 filters the run-off water to remove positively charged ions, which are typically distributed in the dissolved phase, including nutrients such as ammonia nitrogen ($NH_4^+$—N), and heavy metal contaminants such as zinc, copper, lead, nickel, cadmium, chrome, platinum, palladium, vanadium, rhodium or the like. In one example, the ion exchange filter 110 includes a natural zeolitic material, such as clinoptilolite or the like.

It should be noted that in classical filtering systems such as those referenced above, nutrients such as ammonia nitrogen are not removed. As a result, the ammonia nitrogen typically oxidises to form nitrates, which are generally then harder to remove. By using an ion exchange filter, such as a zeolite based filter, this successfully removes ammonia nitrogen prior to oxidation, thereby maximising the opportunity to remove such nutrients. Additionally, the zeolite has a higher affinity for ammonia compared to heavy metals, thereby ensuring adequate nutrient filtration, which is particularly important in reducing environmental contamination.

At step 230, the sorption filter 120 filters the run-off water to remove negative charged heavy metals such as arsenic in both species arsenate and arsenite and nutrients such as nitrates, phosphates, or the like. Additionally, the sorption filter 120 has the capacity to remove positively charged heavy metal ions that have not been completely filtered by the ion exchange filter 110, such as zinc or copper, and therefore enhancing the overall performance of the system. The sorption filter typically includes a filter material such as laterite, or other similar materials. Additionally, and/or alternatively the sorption filter can include almuinium oxides and/or brown coal, both of which are suitable for removing heavy metals such as zinc and copper.

It will be appreciated that the order of the ion exchange and sorption filters may be reversed, depending on the preferred implementation. However, typically the ion exchange and sorption filters are located downstream of the mechanical-sorption filter to allow contaminants such as oil and grease to be removed from the run-off prior to filtration by the ion exchange and sorption filters. This helps maintain the life span and filtration ability of the ion exchange and sorption filters.

The above described process allows run-off to be treated cheaply and easily, thereby enabling a reduction in pollution levels caused by run-off. Selection of appropriate filter materials allows the treatment process to be performed more cheaply than using existing techniques, thereby making the process commercial viable, as well as ensuring filtering of a wide range of contaminants.

For example, zeolites are hydrated aluminosilicate minerals that have a micro-porous structure, represented by the chemical formula:

$$M_{2/n} \cdot Al_2O_3 \cdot SiO_2 \cdot wH_2O$$

where: y is 2 to 10
  n is the cation valence
  w represents water contained in voids in the structure Structurally, zeolites are complex, crystalline inorganic polymers based on an infinitely extending three dimensional, four connected framework of $AlO_4$ and $SiO_4$ tetrahedra linked to each other by the sharing of oxygen ions. As each $AlO_4$ tetrahedra bears a net negative charge, zeolites typically naturally include positive exchangeable ions, such as sodium $Na^+$, $K^+$, $Ca^{2+}$, and $Mg^{2+}$ ions, embedded within the micro-porous structure.

In use, as run-off water containing heavy metal ions such as zinc, cadmium or the like, passes through the structure, the exchangeable ions in the zeolite are displaced by more positively charged ions during the ion exchange process. This results in the removal of the contaminant ions, whilst leaving the run-off water containing a harmless metal based solution.

In practice, zeolites such as clinoptilolite are naturally occurring and can be mined using open pit techniques in many regions. Consequently, zeolites, and particularly clinoptilolite, are cheap and readily available, thereby making them practical for use as a filter material for the ion exchange filter.

Zeolites are typically mined as large rocks, which are therefore unsuitable for use in a filter. Accordingly, the zeolite material is typically crushed or ground into smaller fragments of desired particle diameter such as between 1-3 mm. This increases the, available surface area, thereby enhancing the filtering process, and reduces gaps between adjacent fragments, thereby ensuring adequate filtering of run-off water passing therethrough. The grinding process generates dust that can clog pores of the clinoptilolite, resulting to lower sorption capacity due to the reduced available ion exchange surface. Whilst washing with water can reduce this clogging, typically washing with water alone is unable to remove all the dust from the clogged pores.

Accordingly, in one example, the effectiveness of the crushed zeolites is enhanced using chemical conditioning, which involves exposing the zeolite to a high concentration of salt water solution. This can be performed by washing the grinded zeolite in a sodium chloride solution. The high concentration of $Na^+$ ions causes any other ions present, such as more positively charged Calcium $Ca^{2+}$ ions to be displaced, thereby maximising the effectiveness of the ion exchange process by altering the surface charge of the material.

In any event, as the chemical treatment can be readily and cheaply performed, this allows the effectiveness of clinoptilolites and other zeolites to be enhanced, thereby further improving their effectiveness.

Negative ions, and certain soluble contaminants are not suited for removal using ion exchange in the zeolite filter. Accordingly, a laterite based sorption filter is provided.

Laterites are formed by leaching of and enrichment with aluminium and iron oxides of silica based rocks. Laterites typically include minerals such as kaolinite, goethite, hematite and gibbsite, and therefore contain $SiO_2.Al_2O_3.Fe_2O_3$ in various ratios. Laterites can include soft porous material, as well as hard, dense rocks, depending on the nature of the parent rock and the weathering that has occurred.

Porous laterites have a high surface area, and in use contaminants bind to the surface of the laterite, becoming embedded therein. The filtering ability is therefore directly related to the surface area of the laterite. Accordingly, a porous laterite is preferred, and the absorption capabilities can be enhanced by treating the laterite with 0.01 M $HNO_3$, which increases the specific surface area.

Again, it will be appreciated that as laterites are naturally occurring, these are again readily available and cheap, making these suitable for use in the above described processes.

The sorption filter may alternatively include filter materials such as aluminium oxides or brown coal for additional removal of heavy metals such as zinc or copper. In one example, aluminium oxides or brown coal replace the laterite, to thereby increase the ability of the system to remove heavy metals, at the expense of being able to remove nutrients, such as phosphates and nitrates. This configuration is therefore particularly suited for industrial waste water run-off or the like, which does not typically include a high nutrient content.

Alternatively, in the event that the run-off water includes high levels of both nutrients and heavy metals, the sorption filter may include a combination of laterite and either aluminium oxides and/or brown coal. This allows both the nutrients and heavy metals to be successfully extracted.

Aluminium oxides can be readily obtained as a by product from the bauxite industry, whilst brown coal is also readily available. Accordingly, this makes both aluminium oxides and brown coal readily available and cheap, making these suitable for use in the above described processes.

It will be appreciated that the laterite, aluminium oxides, and/or brown coal, would typically be provided in particulate form having a diameter in the region of between 1-3 mm, for similar reasons to those discussed above with respect to clinoptilolite.

The mechanical-sorption filter typically includes polypropylene flakes, whose material properties are suitable for mechanically filtering small particles, such as organic or inorganic colloidal or particulate material. The use of the outer polypropylene filter protects the pores of the inner clinoptilolite and laterite granules from clogging due to oil, grease and colloidal particles. Polypropylene flakes are also widely available and cheap, making them particularly suited for use in the filter apparatus.

Clogging can be further reduced by the use of a pre-filter for removing larger debris, such as leaves, litter or the like. In some instances this may not be required, although reducing clogging downstream can significantly extend the life and improve the efficiency of the filter processes, thereby making the use of the pre-filter advantageous. The filter can be constructed from a wire mesh, or the like, and in one example, the pre-filter can form part of an existing filtration system that is being enhanced by the filter apparatus.

As the filter materials discussed in the above examples are cheap and readily available, this allows for low cost treatment of run-off water, which in turn makes treatment of run-off water practical.

Figure 3A:
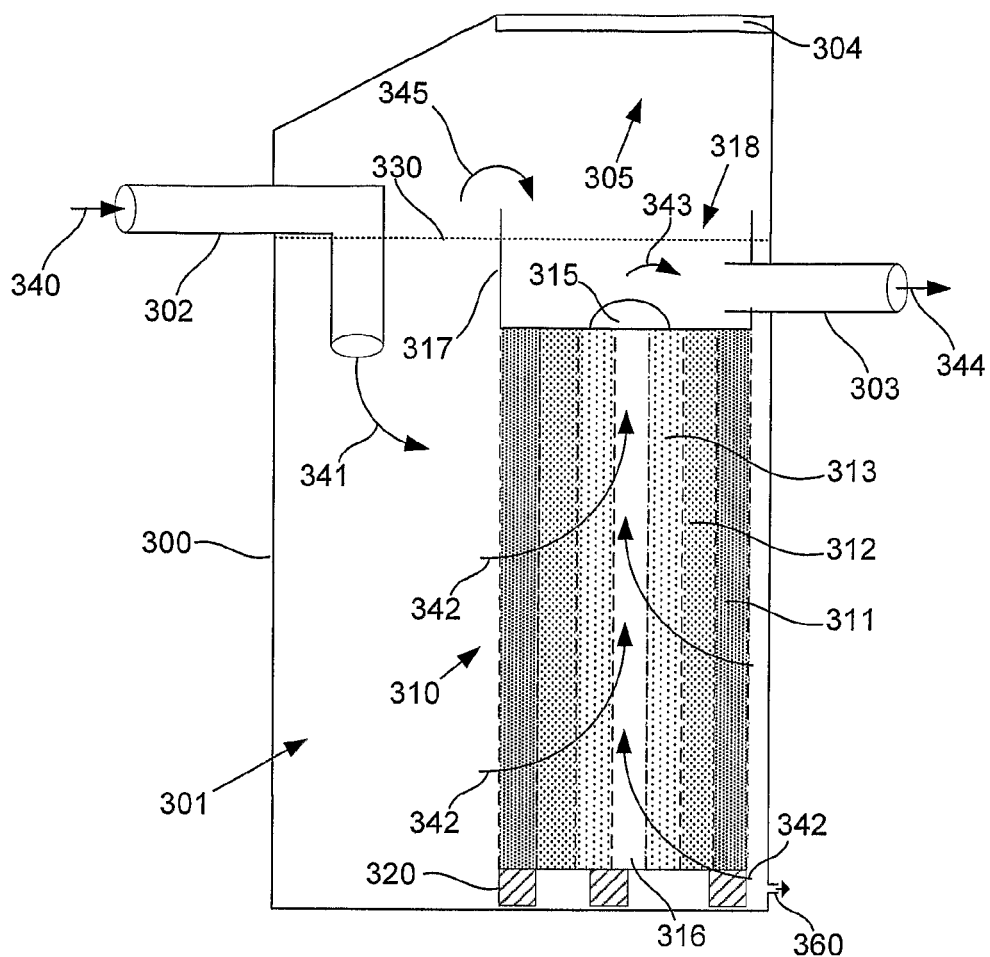
FIG. 3A shows a schematic side view of a second example of a system for treating run-off water; and, FIG. 3B shows a schematic plan view of the apparatus of FIG. 3A.
Figure 3B:
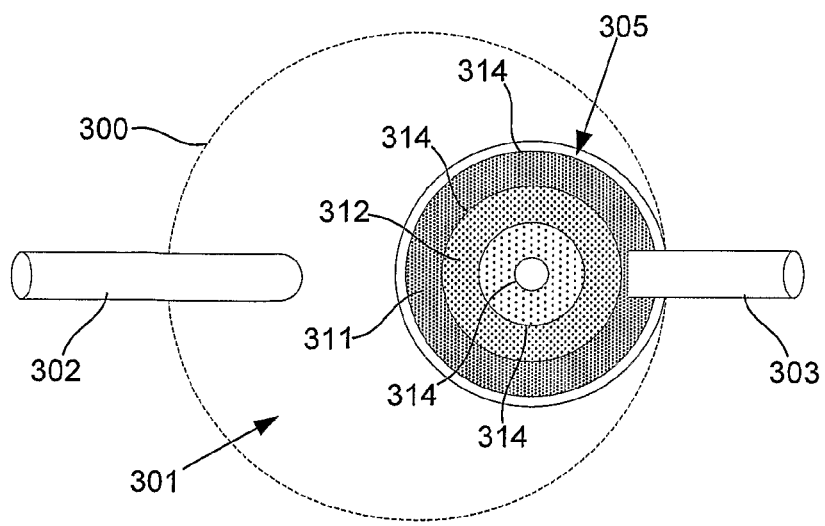

An example apparatus will now be described in more detail with reference to FIGS. 3A and 3B.

In this example, the apparatus includes a housing 300 defining a cavity 301. The housing 300 includes an inlet pipe 302, an outlet pipe 303, and a removable cover 304, mounted in an opening 305 to provide access to the cavity 301. In one example, the housing 300 is in the form of a subterranean pit, lined with a suitable material such as concrete, fibreglass, PE (polyethylene), or the like, with the opening 305 being a man-hole, to thereby provide access to the cavity 301.

A body 310 containing the filters is provided in the housing 300. In this example, the body is in the form of a cylindrical shape having a diameter smaller than that of the opening 305, thereby allowing the body 310 to be removed from the housing 300, although this is not essential.

In this example, the filters are in the form of concentrically arranged annular filter regions 311, 312, 313, defined by respective meshes 314, which could be formed from wire, PE, or the like. The relative sizes of the filter regions, and in particular the height, inner and outer diameters, are selected based on a combination of factors, such as the required filtration capacity, the characteristics of the catchment area, the local climatic conditions, the nature of the likely contaminants, or the like. Thus, for example, if it is expected that there will be a high volume of run-off, a larger volume of filter material will be used. Additionally, if some contaminants are particularly difficult to filter, the thickness of the region may be increased, to effectively increase the amount of filtering performed on the water as it passes therethrough.

In this example, the outer filter region 311 contains the polypropylene flakes to form the mechanical-sorption filter 100, the middle filter region 312 contains the clinoptilolite to form the ion exchange filter 110, and the inner filter region 313 contains laterite to provide the sorption filter 120. As previously discussed, the order of the ion exchange and sorption filters 110, 120 can be reversed. A head pipe 315 is provided extending from a central region 316, inward of the inner filter region 313, into a head 317, which is in turn coupled to the outlet pipe 303.

In use, the housing 300 is connected to a run-off drain, which typically directs run-off water from one or more sources to a release point in a river, storm water drain, or the like. When run-off water is created, for example during a rain or storm event, the run-off water flows along the inlet pipe 302, as shown by arrow 340, and enters the cavity 301, as shown by arrow 341. As water is received in the cavity 301, the water level rises, with water passing through the filter materials provided in the filter regions 311, 312, 313, into the central region 316, as shown by the arrows 342. As a result, the central region 316 contains filtered water.

When a water level 330 extends to a height above the head pipe 315, the water pressure in the cavity 301 is sufficient to urge water from the central region 316, through the head pipe 315, and into the head 317, as shown by the arrow 343. The filtered run-off water then exits the housing 300 via the outlet pipe 303, as shown by the arrow 344.

In the event that excess flow occurs, for example, if the filter becomes blocked, or if the inflow rate is greater than the capacity of the filter, the head 317 can include a head opening 318, which provides an overflow path to allow water to flow directly from the cavity 301 into the head 317, as shown by the arrow 345. This allows water to flow directly through the cavity 301, from the inlet pipe 302, to the outlet pipe 303, thereby preventing the cavity 301 overflowing. It will be appreciated that in this instance whilst unfiltered water is provided to the outlet pipe 303, this is preferable to an overflow occurring.

When run-off flow stops, water drains via the outlet pipe 303 to a level below that of the outlet pipe 303. The water level will typically fall further, for example due to evaporation, and through the use of an optional drainage hole 360 in the cavity 301, which allows the excess run-off water to drain from the cavity into the environment. In this example, the supports 320 raise the body 310 so that the body 320 can drain completely as the cavity 301 drains, allowing the filters to drain when not in use. This is advantageous for a number of reasons, such as to assist in replacement of the filter material as will be described in more detail below. It should be noted that whilst the mechanical-sorption and sorption filters may dry out when drained, the ion exchange filter typically contains clinoptilolite which is hydrophilic, and will therefore tend to stay wet for a prolonged period of time after the system is drained. This helps increase the available ion exchange surface area at the beginning of a new rain event as the clinoptilolite pore system is water saturated.

The above described arrangement has a number of advantages.

For example, the filtering apparatus can be integrated into standard man-hole arrangements, allowing the filtering apparatus to be easily retro-fitted to existing run-off drainage systems.

However, this is not essential, and the apparatus could be of any size depending on a range of factors, such as the size available for an installation, the size of the catchment area, or the like.

In one example, the body 310 is in the form of a removable cartridge. This allows the body 310 to be removed from the cavity and replaced once the filter materials are exhausted.

Alternatively, the filter materials may be replaced in situ. This could be achieved, for example, by removing the head 315, and extracting the filter material from the filter regions 311, 312, 313 using a suction pump. New filter material can then be provided in the filter regions 311, 312, 313 to thereby replenish the filter. This is assisted when the filter material is drained, reducing the likelihood of the material clogging the suction pump.

It will also be appreciated from this that the use of a housing 300, such as a pit is not essential. Thus, for example, the body 310 could be used as a cartridge that can be incorporated into existing filtration systems. It will be appreciated that in this instance, the physical arrangement of the cartridge may vary to the example shown, to allow incorporation into the existing system.

The contaminants removed from the run-off water are sufficiently retained by the exhausted filter material to allow this to be disposed of easily, for example in landfill sites, without the risk of the contaminants dispersing and causing further pollution. This coupled with the ability to easily replace the filter material renders the filtering apparatus cheap to maintain.

Accordingly, the above described apparatus can provide a fully integrated, single cartridge filter system that simultaneously targets a range of contaminants including oil, grease, nutrients such as nitrogen and phosphorus and dissolved heavy metals. This allows for cost effective treatment of dissolved heavy metals achieving discharge targets far below those currently achievable.

The apparatus can be integrated into existing run-off water drainage systems, and can therefore operate in conjunction with existing conventional upstream stormwater treatment systems, to thereby reduce clogging of the filter with debris such as leaves, litter, or the like. This also allows the apparatus to provide on site treatment solutions and not end of pipe solutions such as wetland and bio-retention systems, making this significantly easier to implement.

Utilising a cylindrical body with an outside to inside flow direction provides a larger effective treatment area while the overall unit has a minimal footprint. This in turn allows for efficient filtering of run-off with a high flow rate. Furthermore, excess flow can be accommodated if required, through the use of an overflow path.

By providing a low cost filtering apparatus that can readily be integrated into existing drainage systems, and which targets a range of different contaminants, this allows the apparatus to be used in both residential and industrial environments.

In one example, the apparatus can provide capacity to treat a run-off area having a variety of sizes, depending on the configuration. In the event that large run-off areas are required to be treated, multiple sets of apparatus can be operated in parallel. Alternatively, multiple cartridges could be incorporated into a common housing, such as an existing filtration system, thereby allowing for an increased filtration capacity.

Installation would be comparable with existing solutions, whilst achieving significantly higher levels of performance. Furthermore, ongoing maintenance is minimal compared to existing solutions with expected cartridge replacement required every 2 years instead of every 6 to 12 months.

The system has the ability to target a wide range of contaminants, allowing the filtering apparatus to be used in a wide variety of situations, and in varying climatic conditions. For example, the filtering apparatus is capable of operating when the run-off water contains high salt levels, as can occur for example when salt is used for de-icing during winter. In this regard, the presence of de-icing salt typically mobilises particulate and colloidal bound heavy metals to the soluble phase, which cannot easily be extracted using classical filtering techniques. However, the use of the above described filtering apparatus allows soluble heavy metal ions to be removed, thereby overcoming this problem.

It will also be appreciated that the above described system can also be used in conjunction with subsequent treatment processes, to thereby further treat the run-off water. Thus, run-off water treated by the filter system can be transferred to a subsequent downstream system, such as a chlorination and/or ultraviolet water system, for further treatment. This can be used to allow run-off water to be treated to a level that allows its reuse in appropriate situations, such flushing toilets or the like. In this example, the above described water treatment apparatus effectively acts as a pre-filter allowing the filtered run-off water to be provided to one or more subsequent downstream treatment processes for further treatment. This allows the filter system to remove contaminants that cannot be effectively removed by the subsequent downstream filtering systems, thereby helping to ensure adequate water quality for the intended use.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. An apparatus for treating run-off water, the apparatus including:
   a) a mechanical-sorption filter for removing particulate and colloidal material; wherein the mechanical-sorption filter includes polypropylene flakes;
   b) an ion exchange filter for removing positively charged ions, wherein the ion exchange filter includes a zeolite filter material; and,
   c) a sorption filter for removing at least one other soluble contaminant, wherein the sorption filter includes a laterite filter material capable of removing both negatively charged ions and positively charged ions; and,
d) wherein the apparatus is arranged so that run-off water passes first through the mechanical-sorption filter, followed by the ion exchange filter and then the sorption filter.

2. The apparatus according to claim 1, wherein the mechanical-sorption filter is for removing at least one of:
a) oil;
b) grease;
c) organic particulate material;
d) inorganic particulate material;
e) Organic colloidal material; and
f) Inorganic colloidal material.

3. The apparatus according to claim 1, wherein the ion exchange filter is for removing heavy metals.

4. The apparatus according to claim 1, wherein the zeolite filter material is clinoptilolite.

5. The apparatus according to claim 1, wherein the zeolite filter material includes particles having a size of approximately 1 to 3 mm.

6. The apparatus according to claim 1, wherein the zeolite filter material is chemically conditioned before use.

7. The apparatus according to claim 6, wherein the chemical conditioning includes exposing the filter material to a salt solution.

8. The apparatus according to claim 7, wherein the salt solution is a sodium chloride solution.

9. The apparatus according to claim 1, wherein the zeolite filter material is capable of removing at least one of:
a) $NH_4^+$—N;
b) copper;
c) zinc;
d) lead;
e) Nickel;
f) Cadmium;
g) Mercury;
h) Vanadium;
i) Chromium;
j) Platinum,
k) Palladium; and
l) Rhodium.

10. The apparatus according to claim 1, wherein the laterite filter material is treated to increase the laterite filter material surface area, before use.

11. The apparatus according to claim 1, wherein the laterite filter material is capable of removing at least one of:
a) arsenate;
b) arsenite;
c) heavy metals including zinc and copper;
d) Nitrates; and
e) Phosphates.

12. The apparatus according to claim 1, wherein the apparatus includes a body containing the filters.

13. The apparatus according to claim 12, wherein the body includes a number of meshes defining filter regions, each filter region containing a respective filter material.

14. The apparatus according to Apparatus claim 13, wherein the filter regions have a substantially annular shape.

15. The apparatus according to claim 14, wherein the filter regions are arranged concentrically, with the ion exchange filter and sorption filter being positioned radially inwardly of the mechanical-sorption filter.

16. The apparatus according to claim 15, wherein the sorption filter is positioned radially inwardly of the ion exchange filter.

17. The apparatus according to claim 15, wherein the body includes a head coupled to the outlet, and wherein in use, water flows into the body, through the filter regions, and into the head, before draining from the housing via the outlet.

18. The apparatus according to claim 15, wherein the body is supported relative to the housing, thereby allowing the filters to drain when not in use.

19. The apparatus according to claim 15, wherein the housing includes an opening having a removable cover for providing access to the body.

20. The apparatus according to claim 19, wherein the body is a removable cartridge, allowing the body to be removed via the opening.

21. The apparatus according to claim 19, wherein the opening allows removal of filter material from the body, thereby allowing the filter material to be replenished.

22. The apparatus according to claim 12, wherein the apparatus includes a housing including an inlet for receiving water and an outlet for supplying filtered water, and wherein the body is coupled to at least one of the inlet and the outlet to thereby filter water flowing from between the inlet and outlet.

* * * * *